(12) United States Patent
Burr et al.

(10) Patent No.: US 12,518,149 B2
(45) Date of Patent: Jan. 6, 2026

(54) IMPLICIT VECTOR CONCATENATION WITHIN 2D MESH ROUTING

(71) Applicant: INTERNATIONAL BUSINESS MACHINES CORPORATION, Armonk, NY (US)

(72) Inventors: Geoffrey Burr, San Jose, CA (US); Kohji Hosokawa, Kawasaki (JP); HsinYu Tsai, San Jose, CA (US); Shubham Jain, Yorktown Heights, NY (US); Pritish Narayanan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 17/488,827

(22) Filed: Sep. 29, 2021

(65) Prior Publication Data

US 2023/0100564 A1 Mar. 30, 2023

(51) Int. Cl.
*G06N 3/063* (2023.01)
*G06N 3/084* (2023.01)
*G06N 5/04* (2023.01)

(52) U.S. Cl.
CPC ............. *G06N 3/063* (2013.01); *G06N 3/084* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 8,659,317 | B1 | 2/2014 | Mohammed et al. |
| 8,843,425 | B2 | 9/2014 | Modha |

(Continued)

FOREIGN PATENT DOCUMENTS

| | | |
|---|---|---|
| CN | 118056209 A | 5/2024 |
| EP | 1850472 A1 | 10/2007 |

(Continued)

OTHER PUBLICATIONS

Zimmer, et al., A 0.32-128 TOPS, Scalable Multi-Chip-ModuleBased Deep Neural Network Inference Accelerator With Ground-Referenced Signaling in 16 nm, IEEE Journal of Solid-State Circuits, vol. 55, No. 4, pp. 920-932, Apr. 2020 (Year: 2020).*

(Continued)

*Primary Examiner* — Wilbert L Starks
(74) *Attorney, Agent, or Firm* — Scully, Scott, Murphy & Presser, P.C.; Jeffrey Ingalls

(57) ABSTRACT

Arrays of neural cores are provided. Each neural core comprises ordered input wires ordered output wires, and synapses, each of the synapses operatively coupled to one of the input wires and one of the output wires. A plurality of signal wires is provided. At least one of the signal wires is disposed along each dimension of the array of neural cores. A plurality of routers is provided, each of which is operatively coupled to one of the neural cores and to at least one of the signal wires along each of the dimensions of the array of neural cores. Each of the routers selectively routes a signal from the at least one signal wire to its coupled neural core. Each of the routers selectively routes a signal from its coupled neural core to the at least one signal wire. The routers segment the ordered input wires and the ordered output wires into segments and independently routes the signals of each segment.

20 Claims, 19 Drawing Sheets

(56) References Cited

U.S. PATENT DOCUMENTS

| | | | |
|---|---|---|---|
| 10,496,770 | B2 | 12/2019 | Kumar et al. |
| 10,699,189 | B2 | 6/2020 | Lie et al. |
| 10,885,425 | B2 | 1/2021 | Imam et al. |
| 2018/0139153 | A1 | 5/2018 | Moradi et al. |
| 2018/0174023 | A1 | 6/2018 | Imam et al. |
| 2018/0189645 | A1 | 7/2018 | Chen et al. |
| 2019/0042909 | A1 | 2/2019 | Sumbul et al. |
| 2020/0012929 | A1 | 1/2020 | Penner et al. |
| 2020/0117985 | A1 | 4/2020 | Burr |
| 2020/0117988 | A1 | 4/2020 | Arthur et al. |
| 2021/0125040 | A1 | 4/2021 | Cassidy et al. |
| 2023/0096894 | A1 | 3/2023 | Burr et al. |

FOREIGN PATENT DOCUMENTS

| | | |
|---|---|---|
| EP | 2962416 A1 | 1/2016 |
| EP | 4409469 A1 | 8/2024 |
| JP | 2024-533019 A | 9/2024 |
| WO | 2018/154494 A1 | 8/2018 |
| WO | 2023/052287 A1 | 4/2023 |

OTHER PUBLICATIONS

Kwon, et al., Rethinking NoCs for Spatial Neural Network Accelerators, 2017 Eleventh IEEE/ACM International Symposium on Networks-on-Chip (NOCS '17), pp. 1-8, Oct. 20, 2017 (Year: 2017).*

Jog, et al., One Protocol to Rule Them All: Wireless Networkon-Chip using Deep Reinforcement Learning, Proceedings of the 18th USENIX Symposium on Networked Systems Design and Implementation, pp. 973-989, Apr. 14, 2021 (Year: 2021).*

Liu, et al., Neu-NoC: A High-efficient Interconnection Network for Accelerated Neuromorphic Systems, 2018 23rd Asia and South Pacific Design Automation Conference (ASP-DAC), pp. 141-146, Jan. 25, 2018 (Year: 2018).*

Fok, et al., A Serial H-Tree Router for Two-Dimensional Arrays, 2018 24th IEEE International Symposium on Asynchronous Circuits and Systems, pp. 1-8, May 16, 2018 (Year: 2018).*

Chen, FPGA Based Multi-core Architectures for Deep Learning Networks, Master's Thesis, University of Dayton, pp. 1-54, Dec. 2015 (Year: 2015).*

Akopyan et al., "TrueNorth: Design and Tool Flow of a 65 mW 1 Million Neuron Programmable Neurosynaptic Chip," IEEE, 14(10): 1537-1557 (2015).

Narayanan et al., "Toward on-chip acceleration of the backpropagation algorithm using nonvolatile memory," IBM Journal of Research and Development, 61(45): 11 pages (2017).

Ni et al., "Design of Router for Spiking Neural Networks," IEEE (4 pages) (2017).

Collet et al., "ROBUST: a new self-healing fault-tolerant NoC router." Proceedings of the 4th International Workshop on Network on Chip Architectures. (2011).

International Search Report and Written Opinion for Application No. PCT/IB2022/000792 dated Apr. 28, 2023.

International Search Report and Written Opinion for International Application No. PCT/EP2022/076650, dated Jan. 10, 2023.

Poluri et al., "Shield: A reliable network-on-chip router architecture for chip multiprocessors." IEEE Transactions on Parallel and Distributed Systems 27(10): 3058-3070 (2016).

Anonymous., "Method to Determine the Shortest Path From the Local Node to Any Other Node in Any Dimensionally Recursive N-ary Fully Connected Mesh Network Using Only the Local and Destination Addresses," IP.Com: 6 pages (2008).

Anonymous., "System and method for efficient access to data in all dimensions of a multidimensional array," IP.Com: 5 pages (2019).

Bell., "Scalable, Parallel Computers: Alternatives, Issues, and Challenges," International Journal of Parallel Programming, 22(1): 23 pages (1994).

Casier et al., "Analog Circuit Design," Springer.com: 362 pages (2017).

Hernandez-Solana et al., "Bluetooth Mesh Analysis, Issues and Challenges," IEEE Access: 17 pages (2017).

Moradi et al., "A scalable multi-core architecture with heterogeneous memory structures for Dynamic Neuromorphic Asynchronous Processors (DYNAPs)," arXiv: 17 pages (2017).

Qiao et al., "A reconfigurable on-line learning spiking neuromorphic processor comprising 256 neurons and 128k synapses," Frontiers in Neuroscience, 9(141):1-17 (2015).

Schemmel et al., "A Wafer-Scale Neuromorphic Hardware System for Large-Scale Neural Modeling," Circuits and Systems (ISCAS), 1947-1950 (2010).

European Patent Office, "EP Examination Report", May 23, 2025, 08 pages, EP Application No 22790517.1.

Hassan et al., "High throughput neural network based embedded streaming multicore processors." IEEE International Conference on Rebooting Computing (ICRC). IEEE (2016).

Liu et al., "RENO: A high-efficient reconfigurable neuromorphic computing accelerator design." Proceedings of the 52nd Annual Design Automation Conference (2015).

International Search Report and Written Opinion for International Application No. PCT/EP2022/076629 mailed Jan. 5, 2023.

Kohji Hosokawa et al. "Circuit Techniques for Efficient Acceleration of Deep Neural Network Inference with Analog-AI", 2019 IEEE International Symposium on Circuits and Systems (ISCAS), IEEE, May 22, 2021 (May 22, 2021), pp. 1-5.

Chang et al. "AI hardware acceleration with analog memory: Microarchitectures for low energy at high speed", IBM Journal of Research and Development, International Business Machines Corporation, New York, NY, US.

Hsinyu Tsai et al. "Recent progress in analog memory-based accelerators for deep learning", Journal of Physics D: Applied Physics, Institute of Physics Publishing, Bristol, GB, vol. 51, No. 28, Jun. 21, 2018 (Jun. 21, 2018), p. 283001.

* cited by examiner

IMPLICIT VECTOR CONCATENATION WITHIN 2D MESH ROUTING

BACKGROUND

Embodiments of the present disclosure relate to multi-core neural networks, and more specifically, to implicit vector concatenation within 2D mesh routing.

BRIEF SUMMARY

According to embodiments of the present disclosure, multi-core neural networks are provided. An array of neural cores is provided, the array having at least one dimension. Each of the neural cores comprises a plurality of ordered input wires, a plurality of ordered output wires, and a plurality of synapses, each of the synapses operatively coupled to one of the plurality of input wires and one of the plurality of output wires. A plurality of signal wires is provided. At least one of the plurality of signal wires is disposed along each dimension of the array of neural cores. A plurality of routers is provided, each of which is operatively coupled to (i) one of the plurality of neural cores and (ii) at least one of the signal wires along each of the dimensions of the array of neural cores. Each of the plurality of routers is configured to selectively route a signal from the at least one signal wire to its coupled neural core. Each of the plurality of routers is configured to selectively route a signal from its coupled neural core to the at least one signal wire. The plurality of routers is configured to segment the plurality of ordered input wires and the plurality of ordered output wires into a plurality of segments and to independently route the signals of each of the plurality of segments.

According to embodiments of the present disclosure, methods of operating a multi-core neural network is provided. Signals are received at a plurality of routers via a plurality of signal wires. The signals are selectively routed, by each of the plurality of routers, from at least one signal wire to a neural core. Signals are selectively routed, by the plurality of routers, from the neural core to the plurality of signal wires. The plurality of routers is configured to segment the plurality of ordered input wires and the plurality of ordered output wires into a plurality of segments and to independently route the signals of each of the plurality of segments. The neural core comprises a plurality of ordered input wires, a plurality of ordered output wires, and a plurality of synapses, each of the synapses operatively coupled to one of the plurality of input wires and one of the plurality of output wires. The plurality of signal wires are disposed along each dimension of an array of neural cores comprising the neural core.

DETAILED DESCRIPTION

Figure 1:
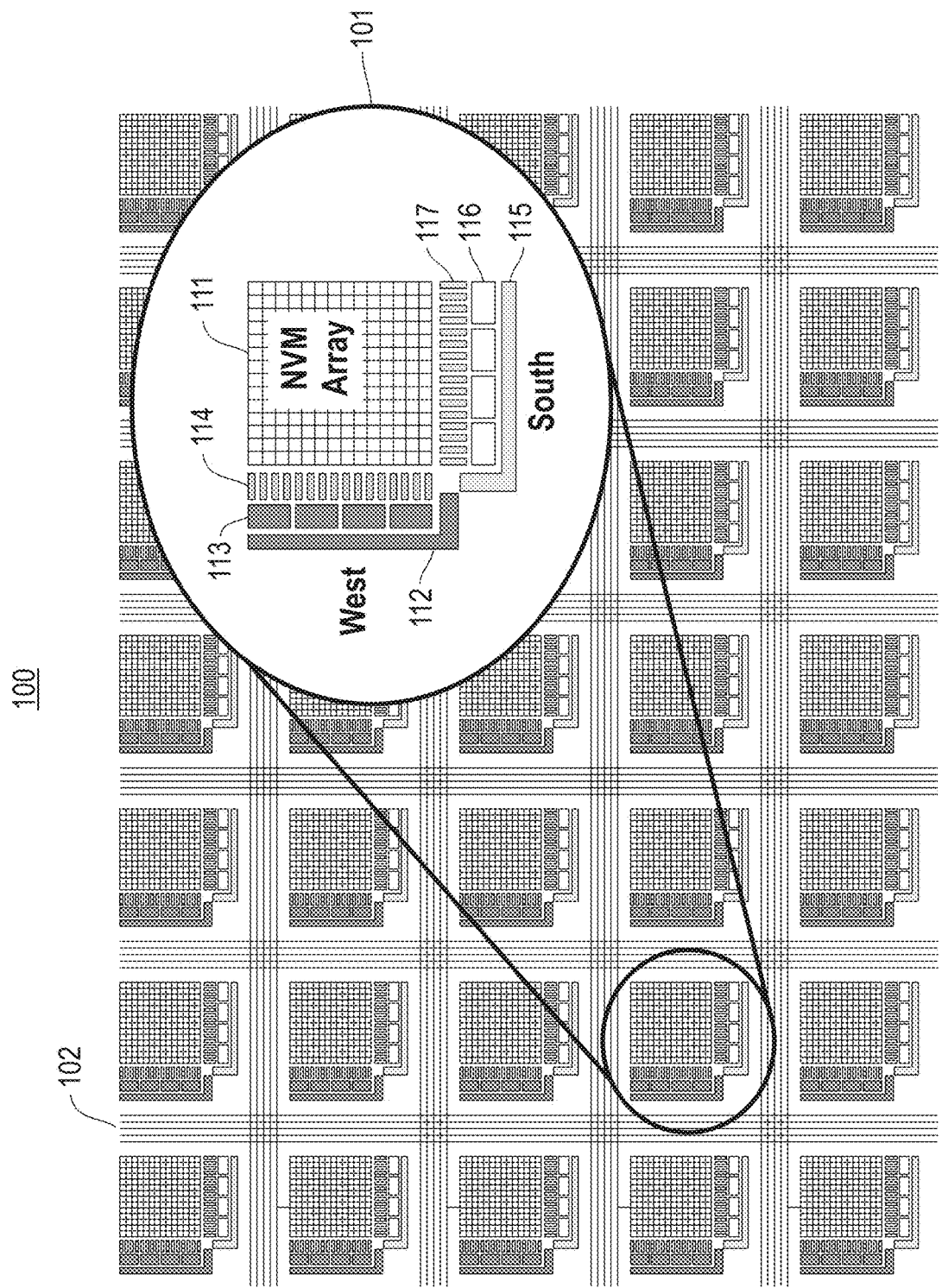
FIG. 1 illustrates an exemplary array of neural cores according to embodiments of the present disclosure.

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from the preceding layer and the strength of the connections as determined by the synaptic weights. An ANN is trained to solve a specific problem (e.g., pattern recognition) by adjusting the weights of the synapses such that a particular class of inputs produce a desired output.

ANNs may be implemented on various kinds of hardware, including crossbar arrays, also known as crosspoint arrays or crosswire arrays. A basic crossbar array configuration includes a set of conductive row wires and a set of conductive column wires formed to intersect the set of conductive row wires. The intersections between the two sets of wires are separated by crosspoint devices. Crosspoint devices function as the ANN's weighted connections between neurons.

In various embodiments, a nonvolatile memory-based crossbar array, or crossbar memory, is provided. A plurality of junctions are formed by row lines intersecting column lines. A resistive memory element, such as a non-volatile memory, is in series with a selector at each of the junctions coupling between one of the row lines and one of the column lines. The selector may be a volatile switch or a transistor, various types of which are known in the art. It will be appreciated that a variety of resistive memory elements are suitable for use as described herein, including memristors, phase-change memories, conductive-bridging RAMs, spin-transfer torque RAMs.

A fixed number of synapses may be provided on a core, and then multiple cores connected to provide a complete neural network. In such embodiments, interconnectivity between cores is provided to convey outputs of the neurons on one core to another core, for example, via a packet-switched or circuit-switched network. In a packet-switched network, greater flexibility of interconnection may be achieved, at a power and speed cost due to the need to transmit, read, and act on address bits. In a circuit-switched network, no address bits are required, and so flexibility and re-configurability must be achieved through other means.

In various exemplary networks, a plurality of cores is arranged in an array on a chip. In such embodiments, relative positions of cores may be referred to by the cardinal directions (north, south, east, west).

In the context of physical arrays of neural cores comprising analog memory elements, the present disclosure provides for flexible routing of signals between array cores of for the purpose of neuromorphic computation. In various embodiments, the data carried by these neural signals are encoded in the pulse-duration carried by each wire, using digital voltage levels suitable for buffering or other forms of digital signal restoration. In other embodiments, data can be directly time-multiplexed as binary pulses representing digital place-value bits, coordinated with edges on local or forwarded clock-signals used for latching the said digital place-value bits at the destination.

While a multiply-accumulate operation can be efficiently performed in a single step within such core arrays, there remains the problem of conveying that output data from the output peripheral circuitry at the edge of one core to the input peripheral circuitry at the edge of some other core. To implement flexible and reconfigurable hardware, the ability to support arbitrary routing paths from any one core to any other core(s) is desirable. While deep learning applications do not require the full flexibility offered by packet-switched networks, it is desirable to support both single-casting and multi-casting of the data from the output neurons of one core to the associated input neurons of multiple other array cores.

In various embodiments of the present disclosure, each neuron on the edge of each core is connectable to a dedicated routing fabric for that particular neuron. The routing fabric comprises a mesh of wires, buffers, and switches that are associated with that particular neuron within the overall data vector corresponding to all neurons at the core edge. While the routing fabric for a single neuron is described in various examples herein, it will be understood that all neurons (or elements of the data-vector) travel in parallel on their own dedicated routing lines. In various embodiments, one or more control lines control all or a substantial fraction of the parallel lines simultaneously. In other embodiments, a register of mask bits allows masked control of a subset of the parallel lines.

The objective in Analog-AI is to perform parallel vector-multiply operations, with excitation vectors introduced onto multiple row-lines in order to perform multiply and accumulate operations across an entire matrix of stored weights encoded into the conductance values of analog nonvolatile resistive memories. As discussed above, methods for array-integrated upstream-downstream routers for circuit-switched parallel connectivity are advantageous for such applications. This scheme allows massively-parallel transmission and buffering of signal vectors, either in duration form or as raw digital data, across Analog-AI tiles and compute-cores.

There is an additional need to address situations in which the vector that must arrive at a particular destination originates from multiple sources, each containing only a subset of the overall long vector. Accordingly, the present disclosure provides for implicit vector concatenation within 2D mesh routing.

In particular, the present disclosure describes a way to implicitly concatenate many short vectors, picked up at different sources across a 2D-mesh, and deliver them as a long concatenated vector at one or more destinations. One advantage of this approach is that a long data vector can be concatenated without the need to serially send the sub-vectors, one after the other, to a common staging point where concatenation would be performed by digital circuitry.

Since each column and row has its own dedicated router circuits with a dedicated path over the 2D router mesh, implicit concatenation requires the ability to have some portions of a borderguard circuit (e.g., vector elements 0 through 31) impose new data onto the 2D mesh (e.g., driving this data North onto the mesh) while having other portions of the borderguard circuit (e.g., vector elements 32 through 511) allow existing data coming in (e.g., from the South) to be buffered and sent onward in parallel with the newly imposed data.

Such a capability allows the implicit concatenation of LSTM vectors, picked up from multiple compute units located at different locations. For example, a vector of length 512 might be implicitly concatenated from 128 data-elements imposed at compute-core 1, another 128 from compute-core 2, and so on, across four compute-cores. This vector can be transported both to multiple tiles, as well as to a core with dedicated SRAM, which might need to store the now-concatenated vector for use later on, for instance, in the context of a bi-directional LSTM.

Care must be taken to organize the compute so that the data to be concatenated all line up on unique columns (rows) of the 2D mesh router, to avoid the possibility that two data-elements needing to be concatenated would attempt to use the same dedicated router wire within the router mesh. In addition, the control circuitry controlling the operations of the borderguard must allow sufficiently fine-grained control to allow the right portions of the data-vector to be passed or imposed onto the router wires, to support this implicit concatenation.

Referring now to FIG. 1, an exemplary array of neural cores is illustrated according to embodiments of the present disclosure. Array 100 includes a plurality of cores 101. The cores in array 100 are interconnected by lines 102, as described further below. In this example, the array is two-dimensional. However, it will be appreciated that the present disclosure may be applied to a one-dimensional or three-dimensional array of cores. Core 101 includes non-volatile memory array 111, which implements synapses as described above. Core 101 includes a west side and a south side, each of which may serve as input while the other serves as output. The west side includes support circuitry 112, which is dedicated to the entire side of core 101, shared circuitry 113, which is dedicated to a subset of rows, and per-row circuitry 114, which is dedicated to individual rows. The south side likewise includes support circuitry 115, which is dedicated to the entire side of core 101, shared circuitry 116, which is dedicated to a subset of columns, and per-column circuitry 117, which is dedicated to individual columns. It will be appreciated that the west/south nomenclature is adopted merely for ease of reference to relative positioning, and is not meant to limit the direction of inputs and outputs.

It will be appreciated that during operation as a classifier, the array of cores may be trained using a variety of methods known in the art. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data. During backpropagation, the vectors of data may be travelling between cores in the opposite direction to that used during forward propagation. Accordingly, if data-vectors were passed from the south side of, e.g., core 3 to the west-side of, e.g., core 4 during forward-propagation, during backpropagation, data-vectors may need to be passed in reverse: from the west side of core 4 to the south side of core 3.

When applying backpropagation, an ANN rapidly attains high accuracy on most of the examples in a training-set. The vast majority of training time is spent trying to further increase this test accuracy. During this time, a large number of the training data examples lead to little correction, since the system has already learned to recognize those examples. While in general, ANN performance tends to improve with the size of the data set, this can be explained by the fact that larger data-sets contain more borderline examples between the different classes on which the ANN is being trained.

Accordingly, during training, array 100 may be provided with example data and example labels. Inferred classifications may be provided as output. Based on the inferred classifications, weight overrides may be provided to the array of cores. In turn, updated weights may be read from the array.

Figure 2:
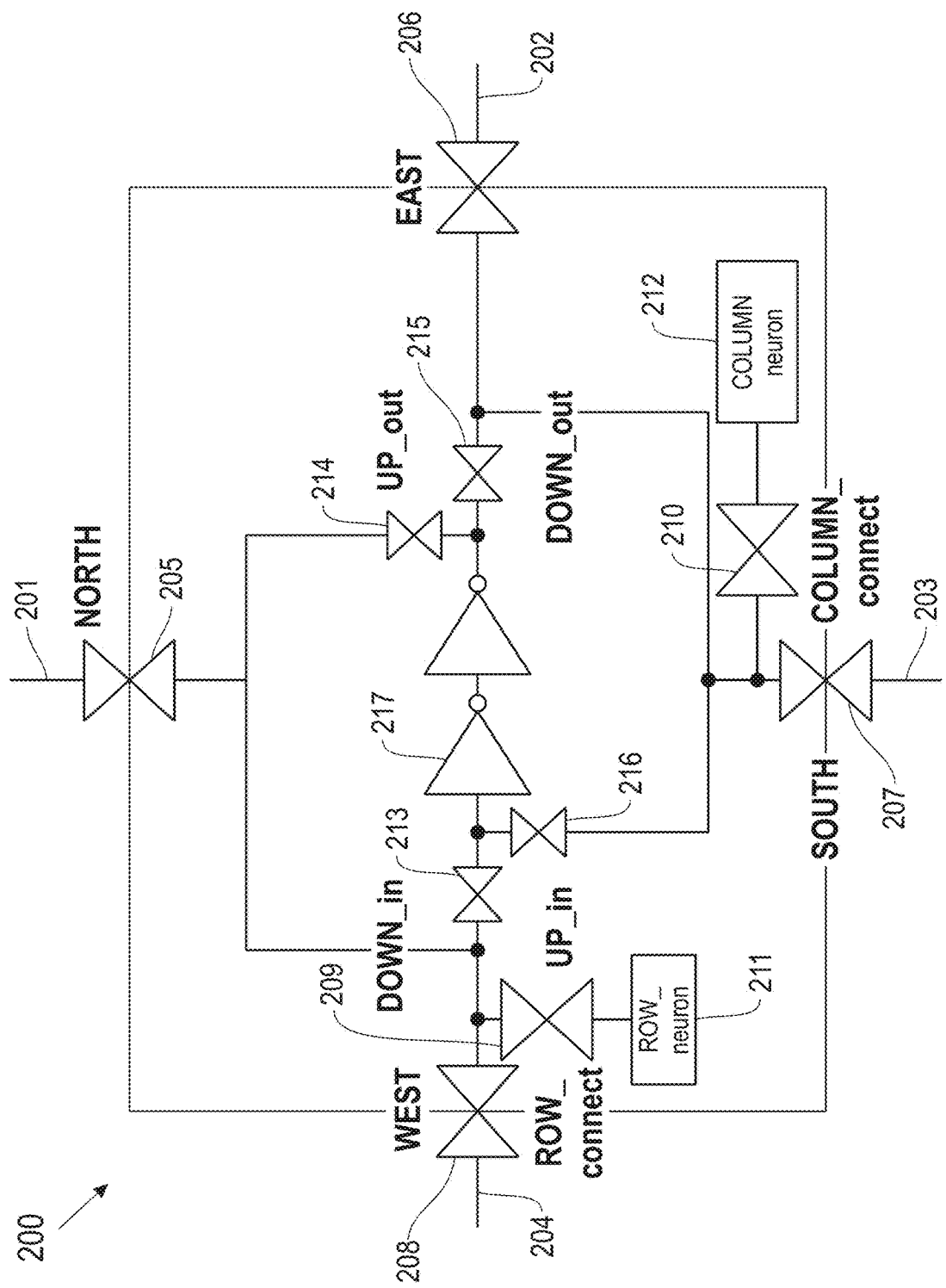
FIG. 2 illustrates an upstream/downstream router for circuit-switched connectivity of neuron circuitry according to embodiments of the present disclosure.

With reference now to FIG. 2, an upstream/downstream router for circuit-switched connectivity of neuron circuitry is illustrated according to embodiments of the present disclosure. In this embodiment, switches are configured at the array edge and the buffers are located within the array. This circuit-switched router addresses the need to transmit an entire vector of output data to another core. In some embodiments, data are encoded as durations. In other embodiments, data are encoded as binary-digits. Synchronization signals, such as an edge that signifies the start of duration-encoded data, or forwarded-clock signals providing an edge for latching of digital place-value bits, may also be transmitted together with the data vector.

Lines 201 . . . 204 provide connectivity between cores in the array and correspond to lines 102 in FIG. 1. As discussed above, each line corresponds to a relative direction on the chip. Each is paired with a transmission gate 205 . . . 208.

Transmission gates 209, 210 (labelled ROW_connect and COLUMN_connect) are provided at the entrance to the ROW 211 and COLUMN 212 neuron circuitry of each core. Each neuron circuit can thereby be connected to (or isolated from) an associated router wire through a transmission gate. In some embodiments, transmission gates are implemented as PFET and NFET connected source to source and drain to drain, with complementary drive signals. In exemplary embodiments, the entrance to columns correspond to the south side of the core and the entrance to rows correspond to the west side of the core.

Transmission gates 213 . . . 216 surround buffer 217. By correctly configuring transmission gates 205 . . . 208 between the cores (labelled WEST, EAST, SOUTH, NORTH); transmission gates 209, 210 at the entrance to each neuron circuit (labelled ROW_connect and COLUMN_connect); and transmission gates 213 . . . 216 surrounding the buffers (labelled DOWN_in, UP_in, DOWN_out, and UP_out), this router can be used to provide circuit-switched routing for each neuron from a neuron circuit on any edge of one array-core, to neuron circuits on the edge of any other array-cores.

In a multi-core environment, the router wire (e.g., 201 . . . 204, which are individual elements of lines 102) passes in the vicinity of each neuron circuitry (e.g., 211, 212, which are individual elements of array 111), and connects via transmission gates (e.g., 205 . . . 208) to the router wire in the next core (to the north, south, east, or west) and to buffer circuitry (e.g., 217) located at each core.

In various embodiments, for simplicity, the router wiring for NORTH and WEST are hard-wired to each other, and the router wiring for SOUTH and EAST are hard-wired to each other. In such embodiments, the buffer circuitry can be used to boost the signal either downstream (NORTH/WEST to SOUTH/EAST) or upstream (vice versa).

Figure 3:
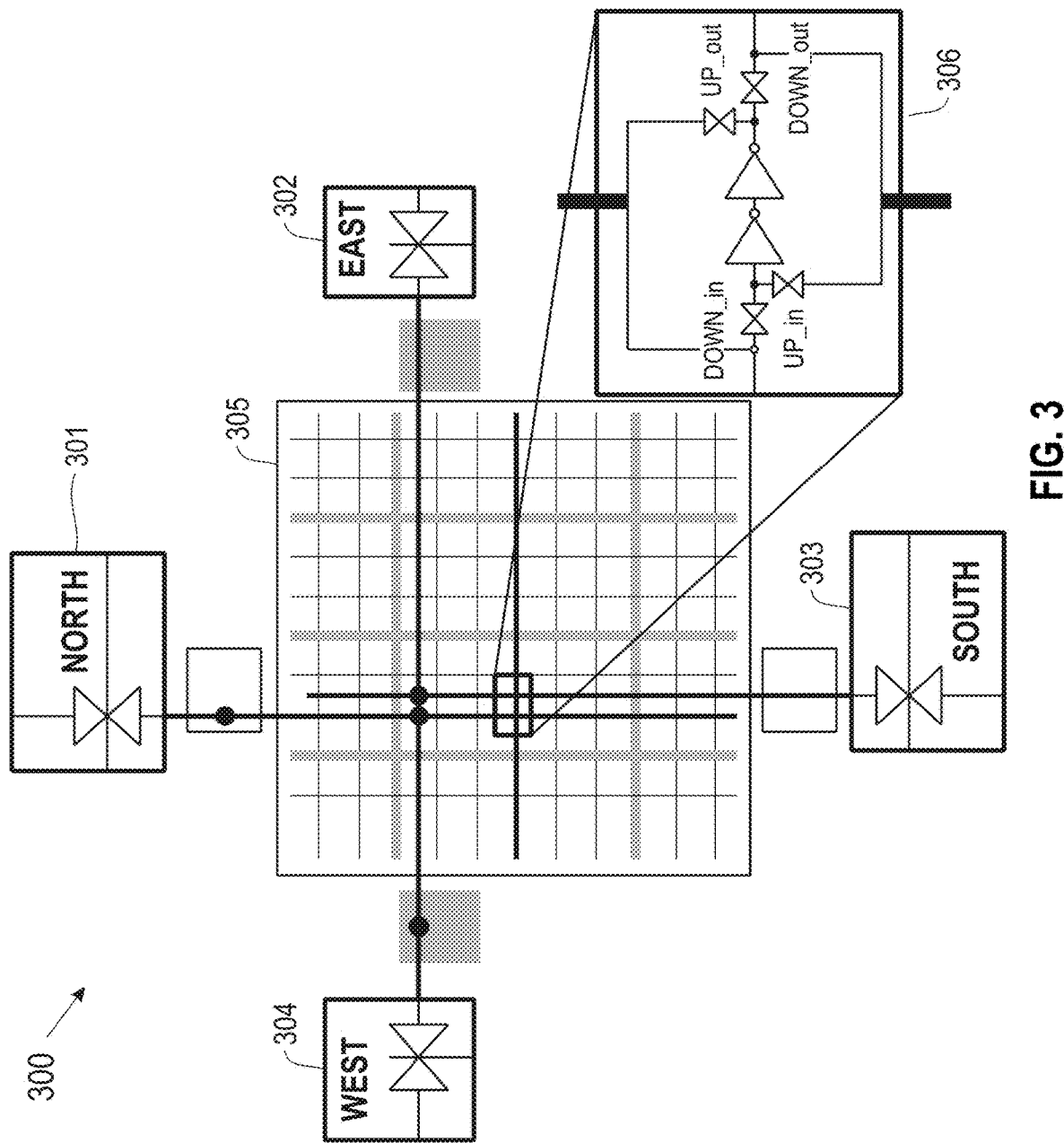
FIG. 3 illustrates an upstream/downstream router configured with a crossbar array according to embodiments of the present disclosure.

Referring to FIG. 3, the router of FIG. 2 is generalized to the multiple neuron case, and the switches and buffers are illustrated relative to the crossbar array. In this view, transmission gates 301 . . . 304 are provided between neighboring cores (labelled WEST, EAST, SOUTH, NORTH) and core 305. In various embodiments, transmission gates 301 . . . 304 are coupled to all arriving neuron routers, so that transmission is selected on a whole core basis. Router 306 (depicted in simplified view) may be configured as described in connection with FIG. 2 to provide circuit-switched routing for each neuron in core 305.

As pictured, in some embodiments, buffer circuitry can be organized so that its location is coordinated to either the row position of the associated neuron circuitry or the column position, and not both.

Accordingly, durations or binary data generated in the periphery (encoding data) are placed by borderguard circuitry onto wiring that runs across the core array. These signals can be buffered or blocked at various other borderguard circuits until they arrive at the target core.

In various embodiments, the buffer circuitry and its transmission gates are placed within the array at periodic positions within the array, at positions that are correlated with the column position and independent of the row (or vice-versa, as needed). The transmission gates between arrays sit at the exterior edges of neuron circuitry, while the transmission gates at the entrance of the neuron circuitry can be included at the appropriate part of the neuron circuitry. As shown in FIG. 3, the use of two north-south wires allows the buffer circuit for a given row to not have to be co-located at that row, since the north-south wires convey the signals to the physical position of the buffers. In some embodiments, this can be inverted so that there are two east-west wires and the position of the buffer is coordinated in row position but not in column position.

Figure 4:
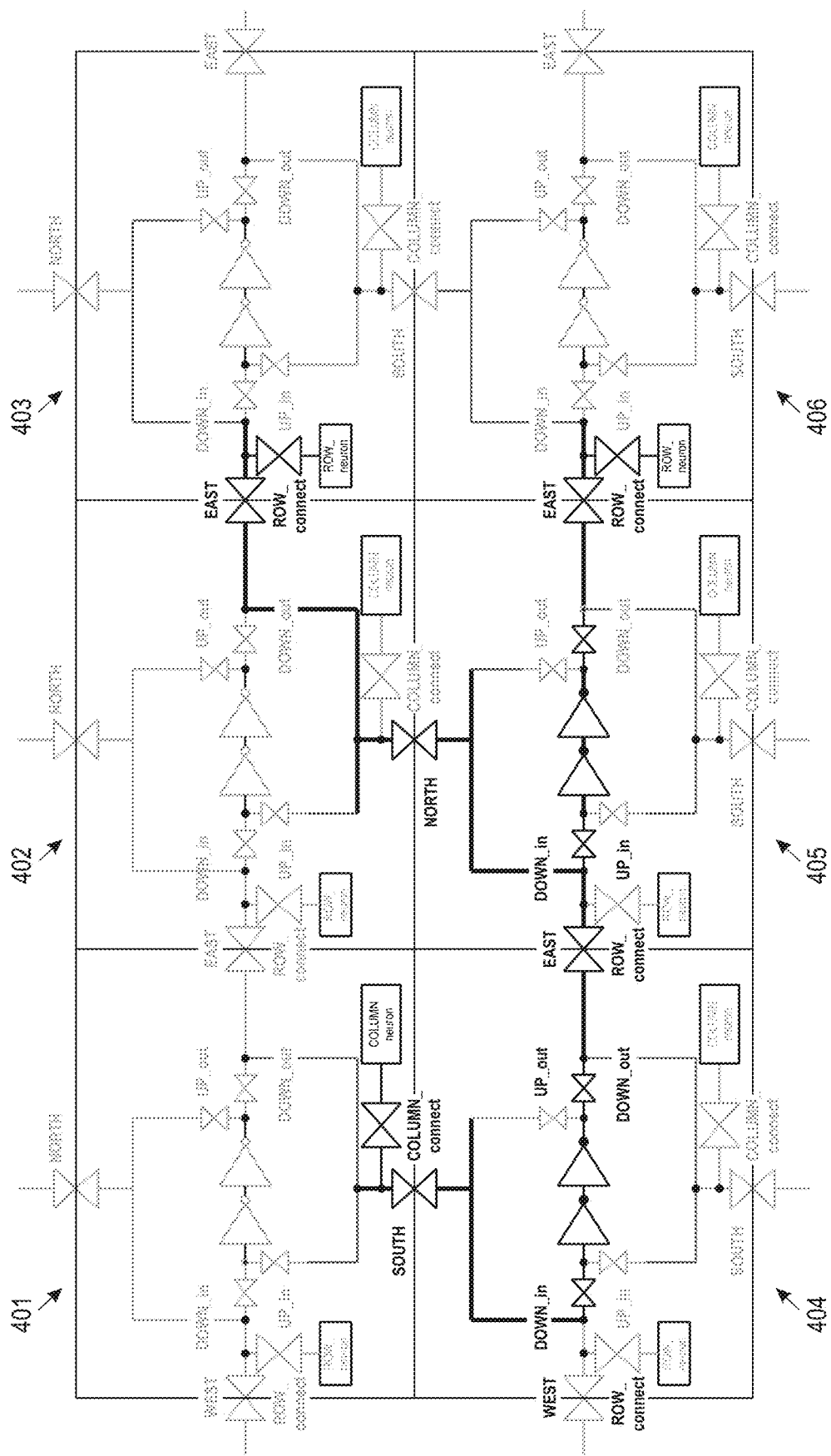
FIG. 4 illustrates an interconnected array of routers according to embodiments of the present disclosure.

Referring to FIG. 4, an interconnected array of routers is illustrated according to embodiments of the present disclosure. In this example, each of routers 401 . . . 406 correspond to an instance of router 200 and are located on neighboring cores.

The gates in this example are configured for multicast routing. The output of a COLUMN neuron on the SOUTH side of core 401 is routed to the ROW neurons on the WEST side of cores that are both close and distant neighbors to this core. Transmission gates that will be CLOSED to enforce this routing network are shown in light gray—open transmission gates remain in their original color. Note that signals are buffered as they pass over any array core in the UPSTREAM/DOWNSTREAM direction, but signals that are passed by the hard-coded connections (e.g., from NORTH to WEST or vice-versa, or from SOUTH to EAST or vice-versa) do not get buffered. Closed transmission gates are shown in grey.

Here the column neurons on the south side of core 401 are driving the router fabric. Open transmission gates within core 404 allow transmission and buffering of this vector of signals as they pass over core 404 but are ignored by row and column neurons of core 404. However, the open transmission gates between cores 404 and 405, between 405 and 402, and between 402 and 403 allow the vector of signals to arrive at the row neurons on the west edge of core 403. Simultaneously, the vector of signals is buffered by the buffers situated within core 405 and the open transmission gates at the borderguard circuit (described further below) between cores 405 and 406, allowing the same vector of signals to arrive at the row neurons on the west edge of core 406. As a result, the data-vector has been multicast from the south side of core 401 to the west sides of both cores 403 and 406, with two buffering stages along the way.

Figure 5A:
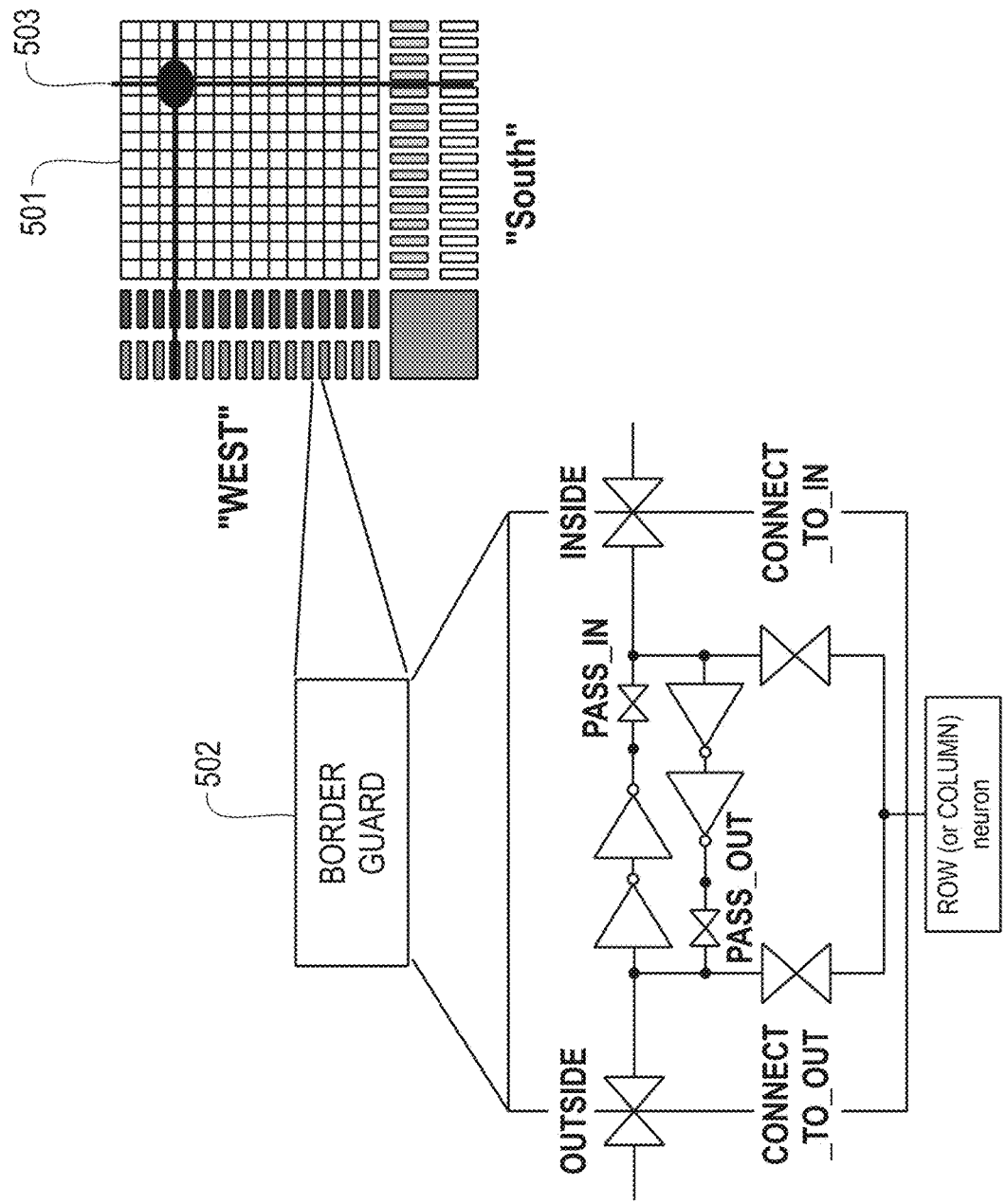
FIGS. 5A-B illustrate an upstream/downstream router including a borderguard circuit at the core edge according to embodiments of the present disclosure.
Figure 5B:
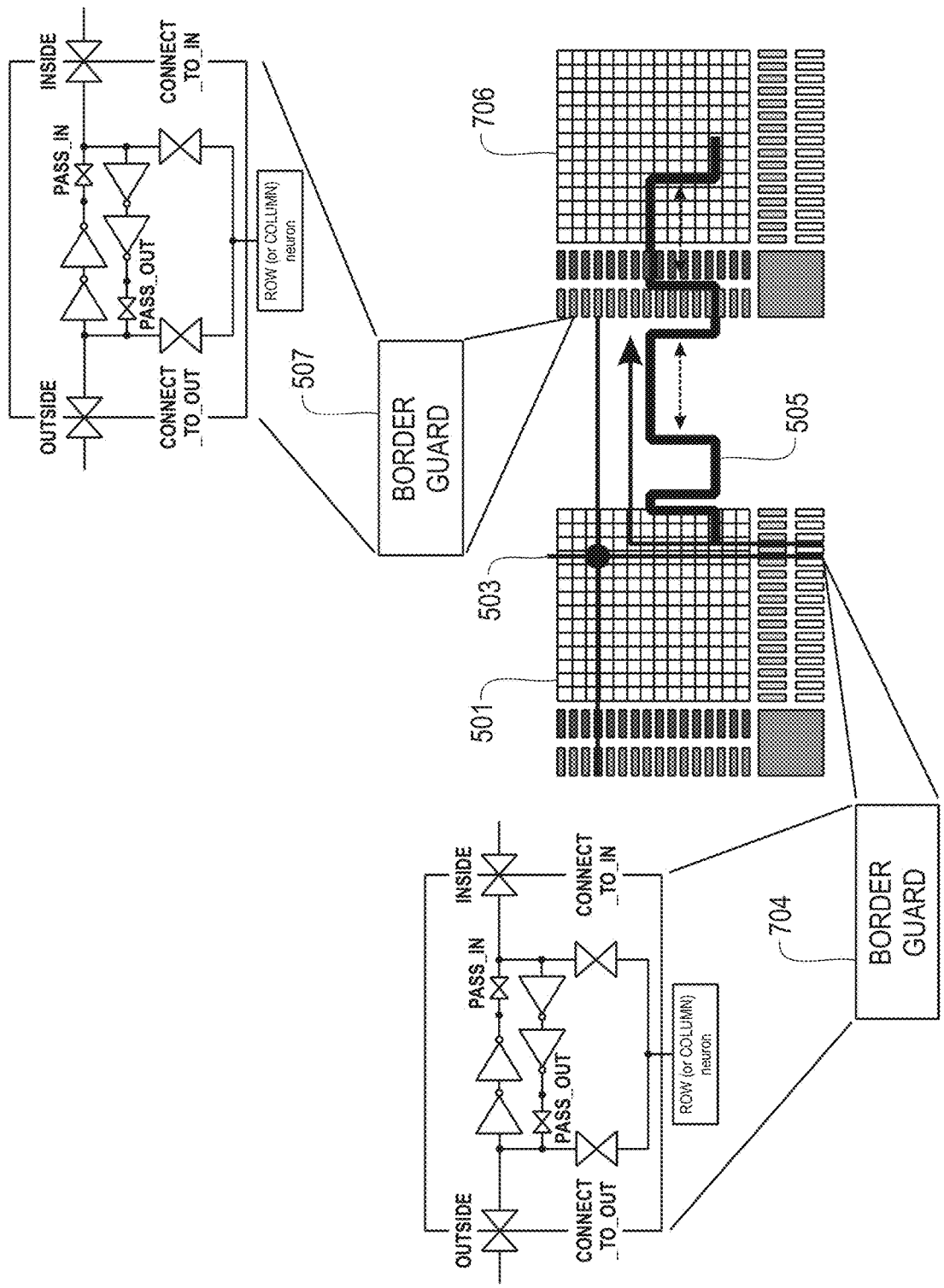

Referring to FIGS. 5A-B, an upstream/downstream router including a shared borderguard circuit is illustrated. In this embodiment, both switches and buffers are located within the borderguard situated at the core edges. This allows elements of a data vector, encoded as one or more pulse durations, to be transported from one or more source cores to one or more destination cores.

In this example, the borderguard circuitry contains the necessary transmission gates and buffers. Accordingly, additional circuitry is not placed within the core itself. While such an embodiment requires slightly larger area because of the need for four inverters instead of two, it provides advantages in terms of buffering at every edge. In addition, this configuration allows row or column neurons at the edge of a core to receive input through the CONNECT_TO_OUT switch from the router fabric over a neighboring core, while a different signal is simultaneously passing over that array core. In such a condition, by closing the transmission gates INSIDE and CONNECT_TO_IN, the row or column neuron can receive data from either the inside-the-array-core portion of the router mesh, or from the outside-the-array-core portion of the router mesh, or neither, without disrupting the transmission of neuron data either downstream (using the PASS_IN transmission gate) or upstream (through the PASS_OUT transmission gate).

Core 501 includes shared circuitry 502 that performs the function of a borderguard, allowing signals in and out of the corresponding edge of the core. At pitch, higher-level wiring 503 is provided to interconnect the cores (corresponding, e.g., to leads 102). The borderguard shared circuitry allows signals in and out of the west and south edges of core 501.

Referring to FIG. 5B, south borderguard circuitry 504 on core 501 connects output signal 505 to wiring 503, with buffering. In turn, signal 505 is routed across zero or more intermediary routers to destination core 506. West borderguard circuitry 507 connects the incoming signal 505 to core 506.

Figure 6:
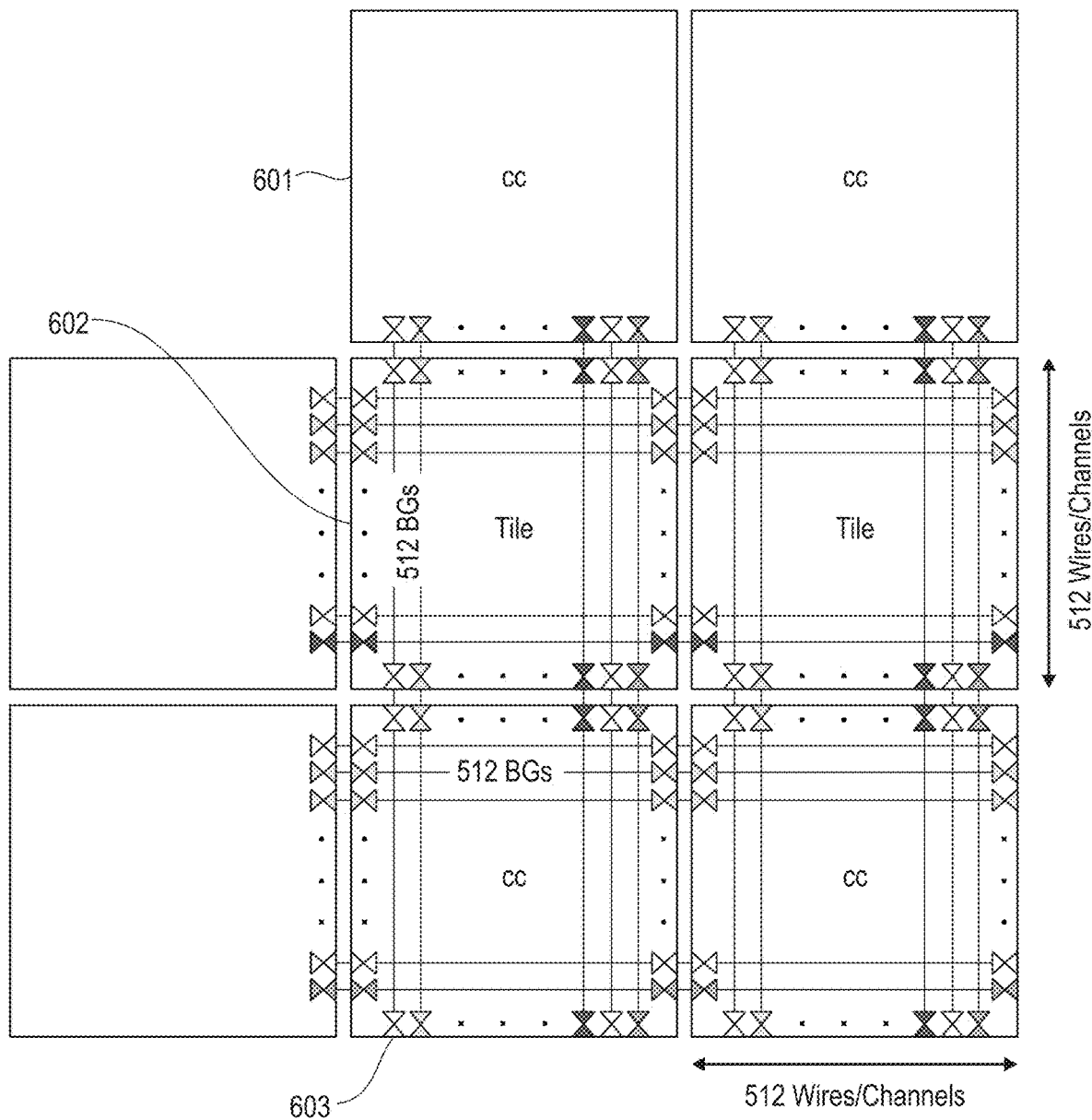
FIG. 6 illustrates an exemplary analog fabric according to embodiments of the present disclosure.

Referring to FIG. 6, an exemplary analog fabric is illustrated according to embodiments of the present disclosure. In various embodiments, a 2D mesh (rendered in perpendicular lines) is provided on top of each component. In various embodiments, the components include compute-cores (CC, 601) and analog tiles (Tile, 602). In this exemplary embodiment, each component has 512 vertical wires (channels) and 512 horizontal channels.

Data routing over each component is controlled using 4-sets of 512 borderguards (BG, 603). Each borderguard includes drivers and switches as described elsewhere herein. In this diagram, BGs with the same color can send data across one another.

Figure 7A:
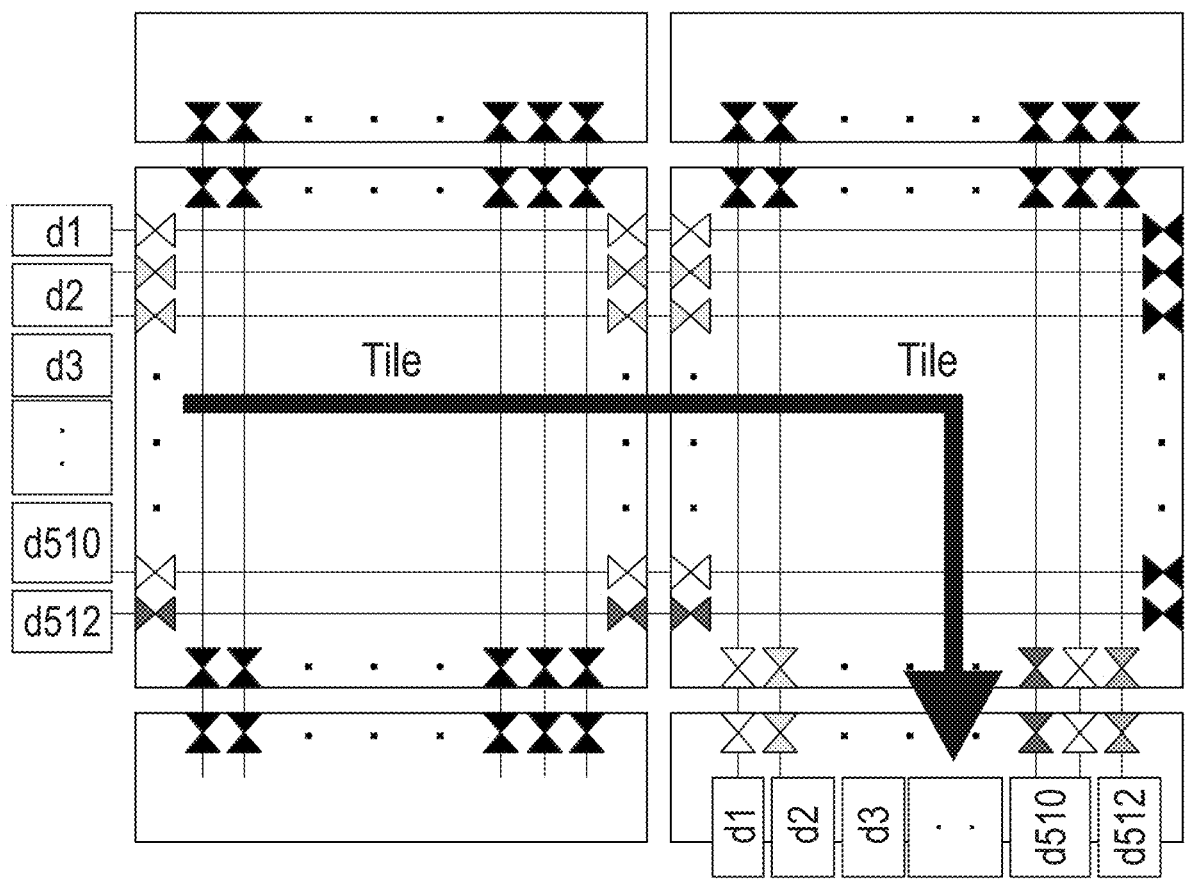
FIGS. 7A-C illustrate exemplary routing of a data vector on analog fabric according to embodiments of the present disclosure.
Figure 7B:
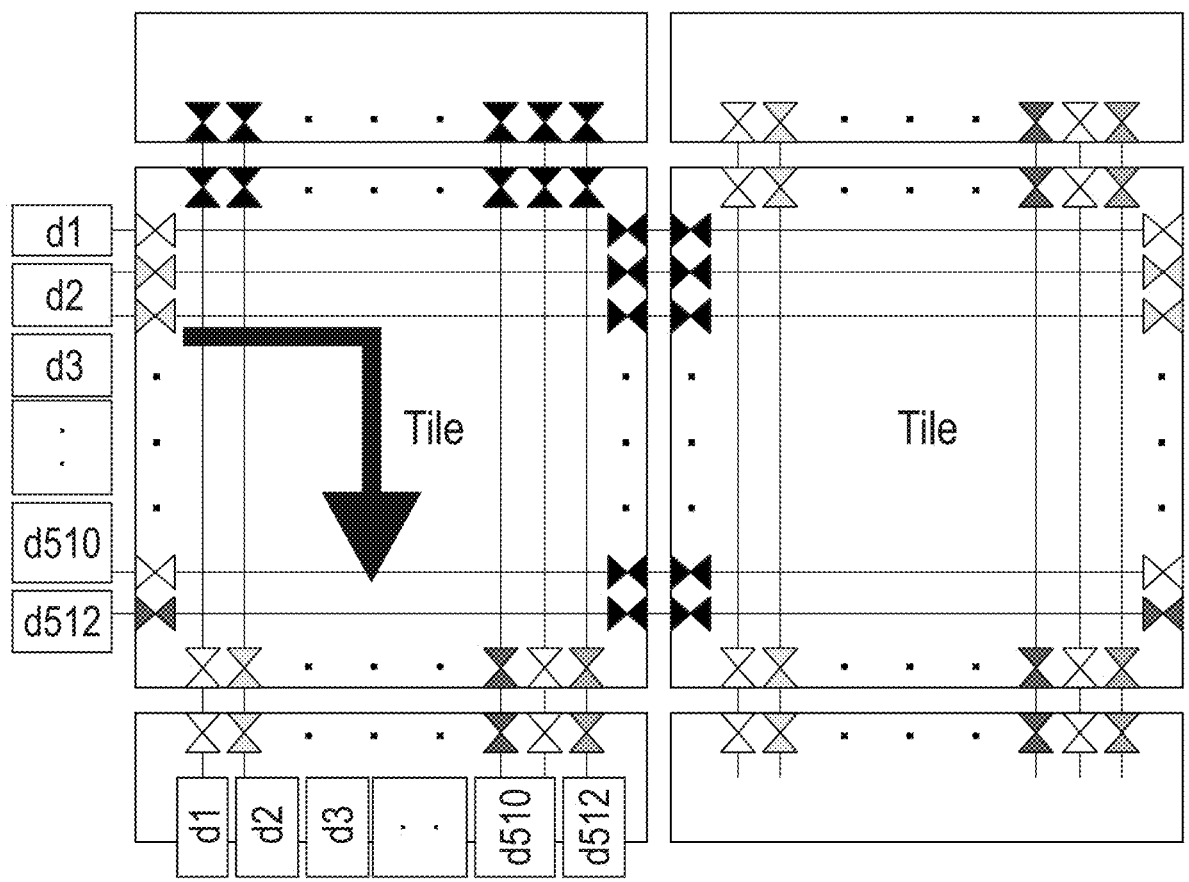
Figure 7C:
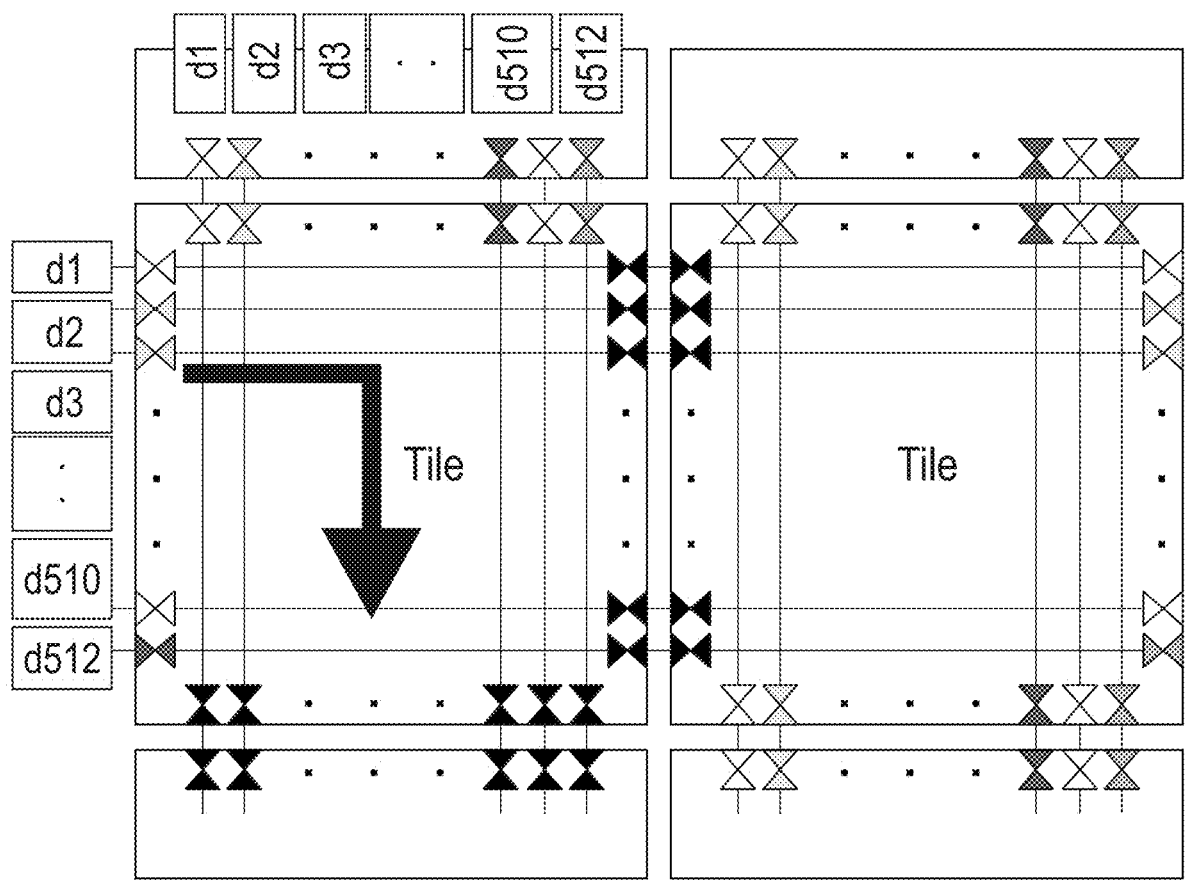

Referring to FIGS. 7A-C, exemplary routing of a data vector on analog fabric is illustrated according to embodiments of the present disclosure. In this example, one producer originated a data vector d1 . . . d512. All BGs on an edge work together to deliver the data vector from one producer of the whole data vector. Multiple consumers may receive the vector, but each consumer is forced to consume the whole data vector.

Figure 8:
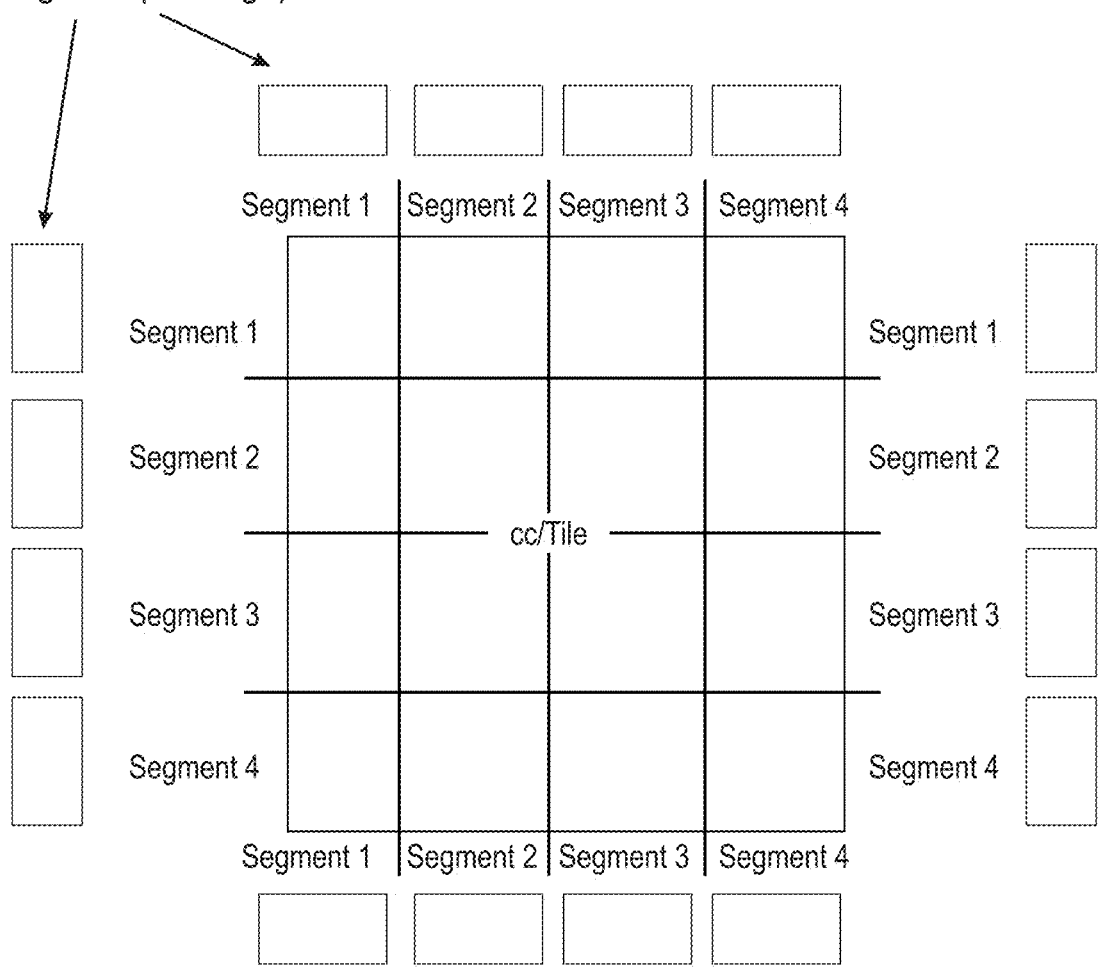
FIG. 8 illustrates a segmented fabric configuration according to embodiments of the present disclosure.

Referring to FIG. 8, a segmented fabric configuration is illustrated according to embodiments of the present disclosure. The border guards per edge are segmented into N groups. In this exemplary illustration, N=4. Each segment is controlled independently, and behavior is software programmable.

BGs can also be interleaved across segments. For example, BG0, BG4, BG8 may be located in physical segment 1.

In various embodiments, control circuitry and mask registers are shared across BGs in a segment per edge.

Figure 9:
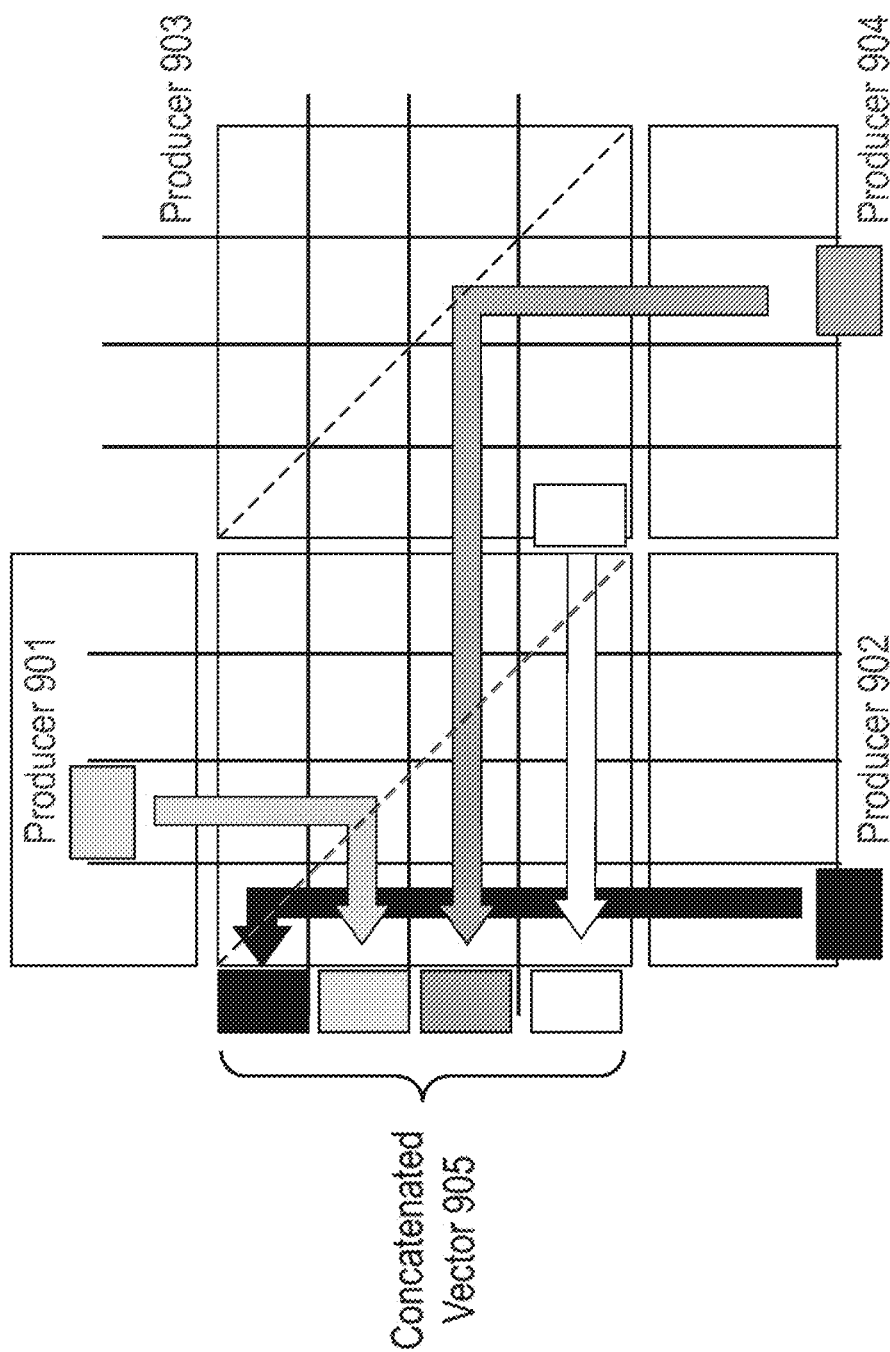
Referring to FIG. 9 illustrates implicit concatenation according to embodiments of the present disclosure.

Referring to FIG. 9, implicit concatenation is illustrated according to embodiments of the present disclosure. In this examples, multiple producers 901 . . . 904 are provided. All producers can either send simultaneously or separately—both options are supported using mask and control circuitry. The segments sent by producers 901 . . . 904 are concatenated into concatenated vector 905.

Figure 10:
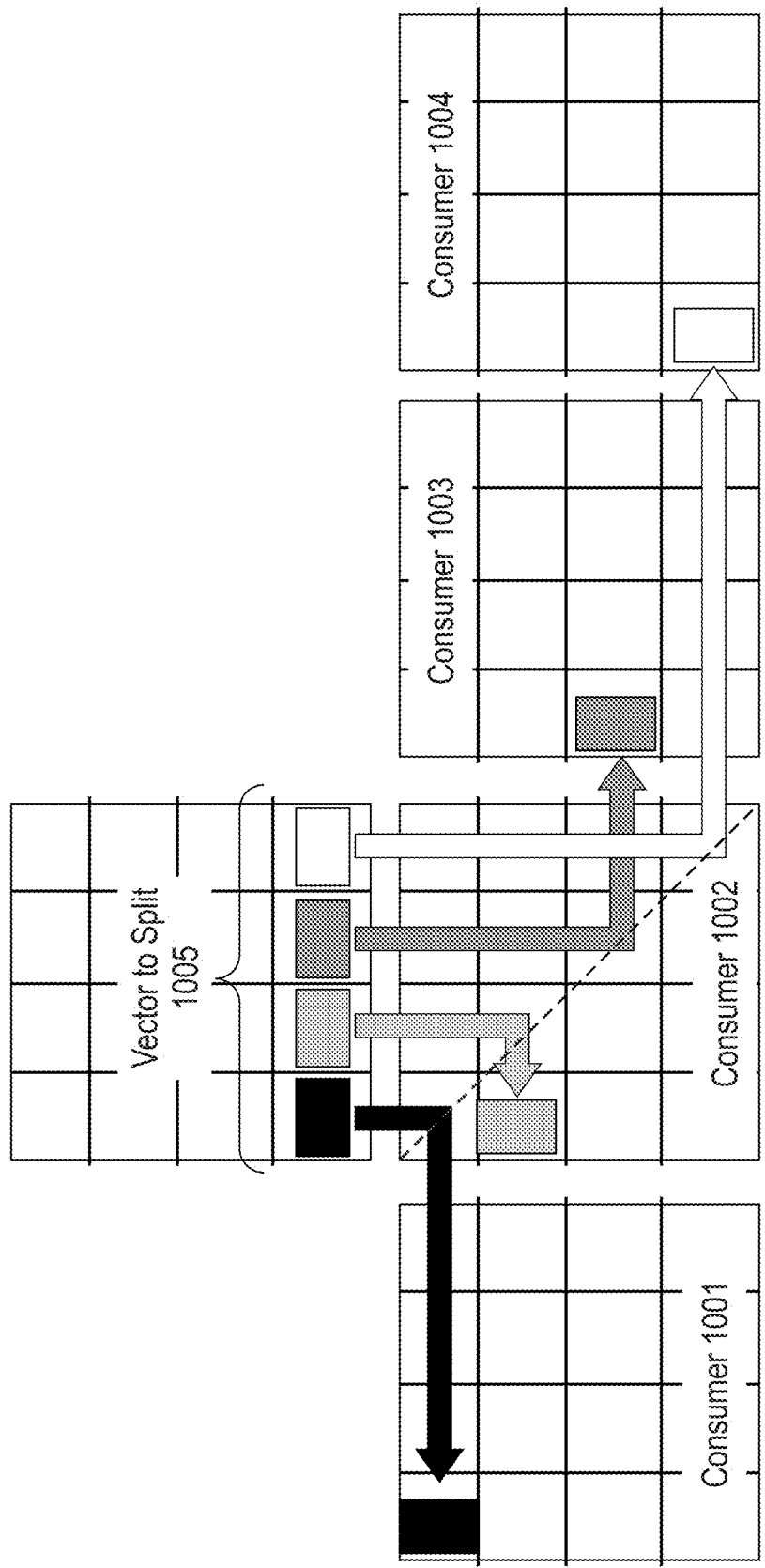
FIG. 10 illustrates implicit splitting according to embodiments of the present disclosure.

Referring to FIG. 10, implicit splitting is illustrated according to embodiments of the present disclosure. In this example, vector 1005 is split across multiple segments, which are routed to multiple partial consumers 1001 . . . 1004.

Figure 11:
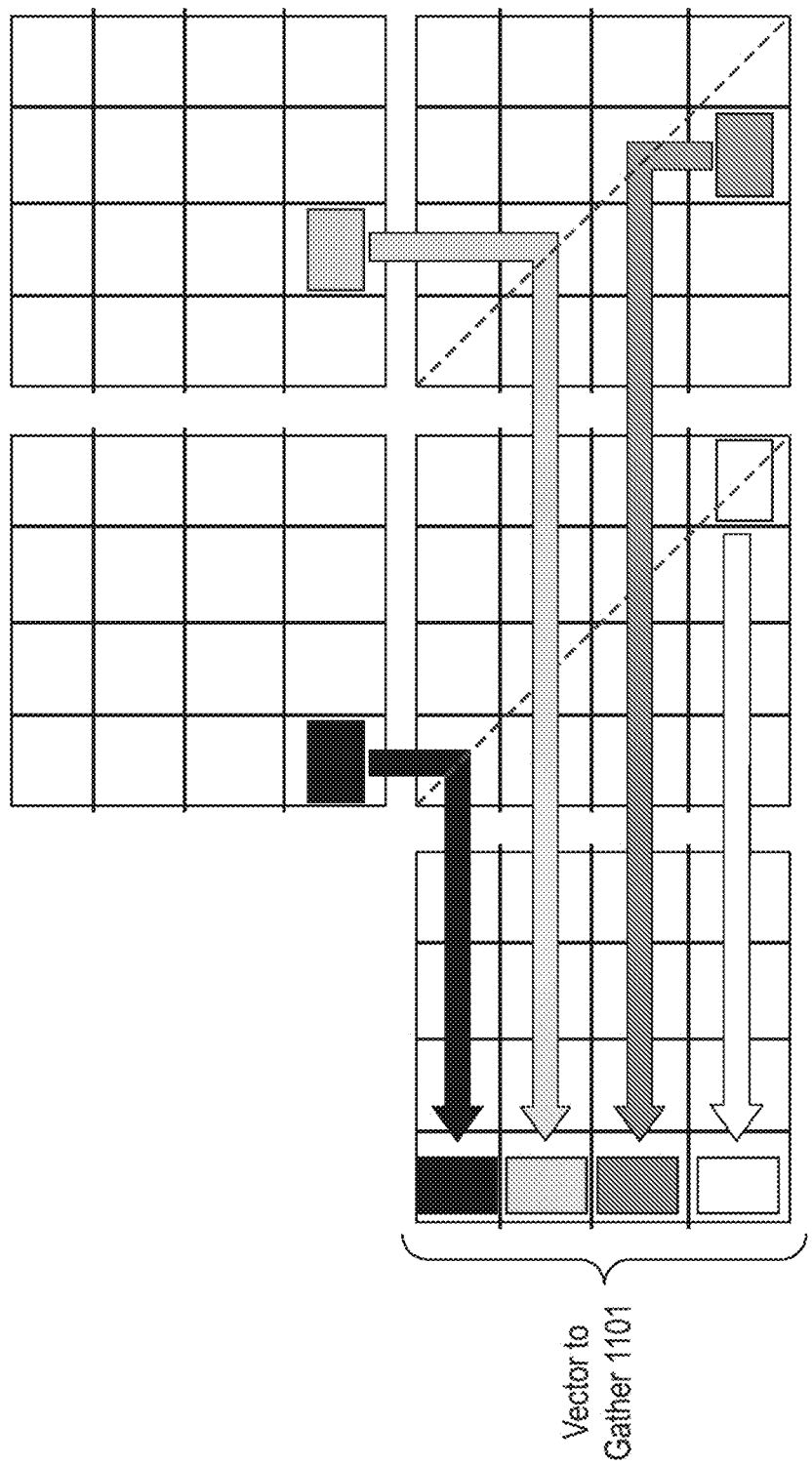
FIG. 11 illustrates gathering according to embodiments of the present disclosure.

Referring to FIG. 11, gathering is illustrated according to embodiments of the present disclosure. In this example, vector 1001 is gather from a plurality of other tiles. It will be appreciated that this is one example of the many data-manipulation operations that are enabled by the present disclosure.

Figure 12:
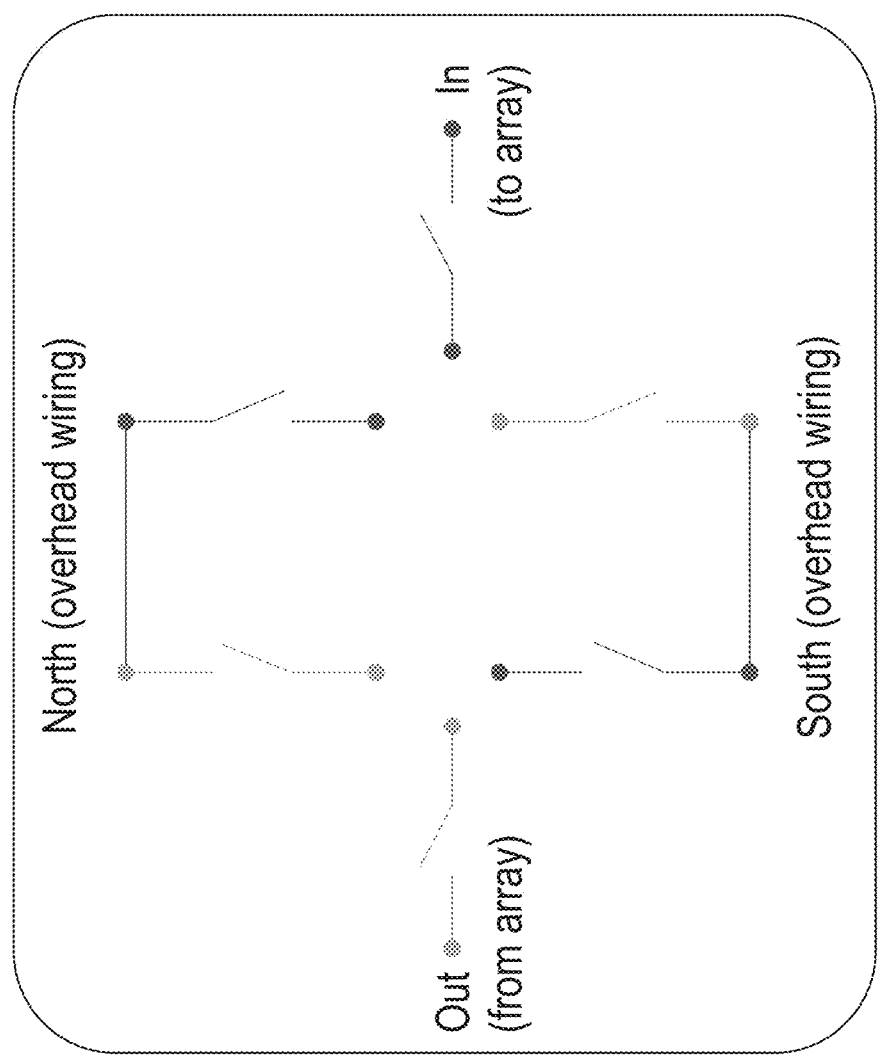
FIG. 12 is a detail diagram of an exemplary borderguard circuit according to embodiments of the present disclosure.

Referring to FIG. 12, a detail diagram of an exemplary borderguard circuit is provided according to embodiments of the present disclosure. A given task is defined in terms of a pair of valid RCV_ and DRV_ operations. Receive operations are RCV_{N|S|OUT} and drive operations are DRV_{N|S|IN}. In various embodiments, the North and South Drivers have buffering and tri-stating.

Figure 13:
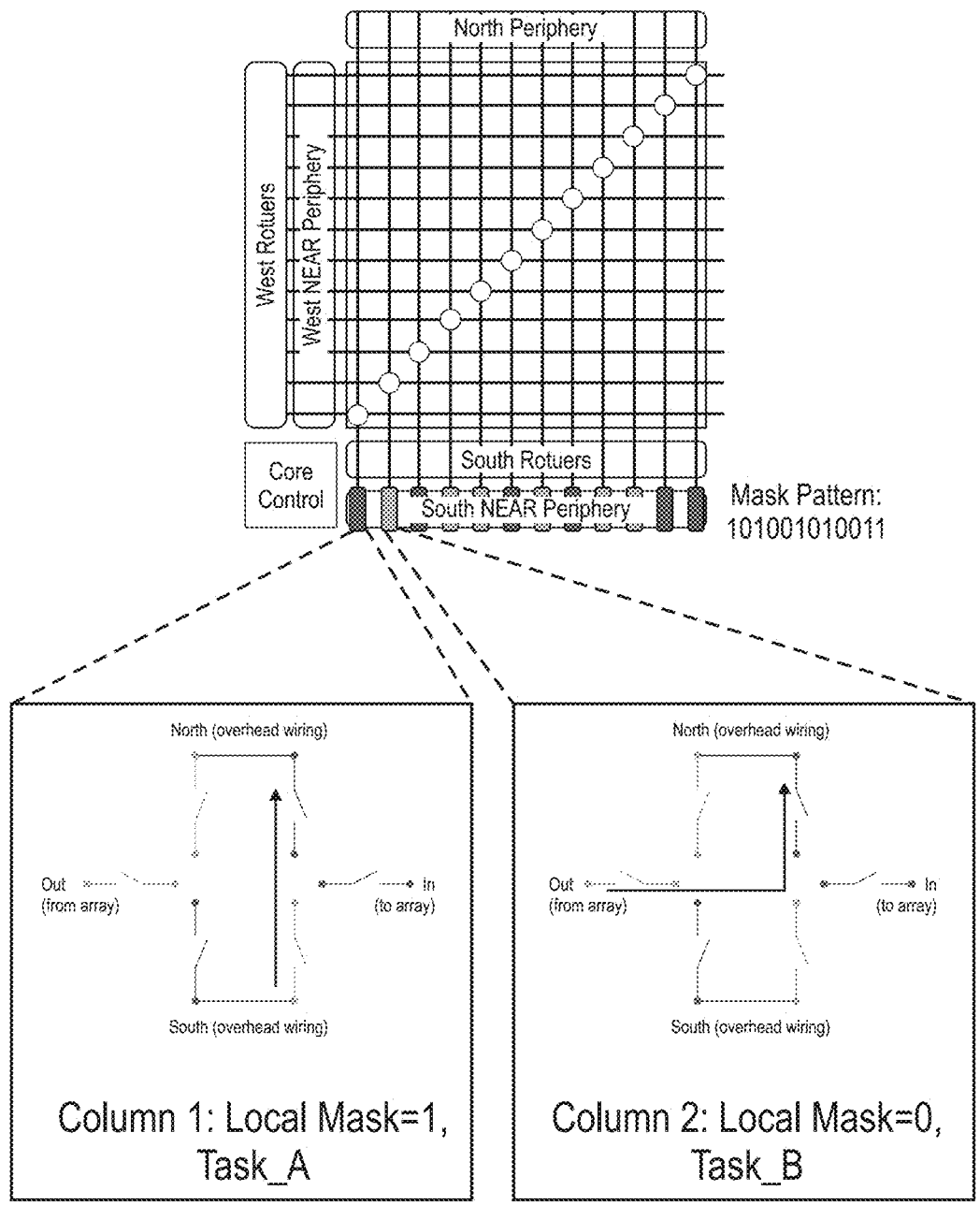
FIG. 13 illustrates an exemplary tile according to the present disclosure employing the circuit of FIG. 12.

Referring to FIG. 13, an exemplary tile is illustrated employing the circuit of FIG. 12. Based on a local mask bit, routing TASK A or TASK B is selected. For example: TASK_A: RCV_S and DRV_N; and TASK_B: RCV_OUT and DRV_N. Using this approach, fine-grain control across every channel is possible. In various embodiments, masks are loaded using the 2D mesh, or using a scan chain. In this example, RCV_A_{N|S|OUT} and RCV_B_{N|S|OUT}; DRV_A_{N|S|IN} and DRV_B_{N|S|IN}.

Figure 14:
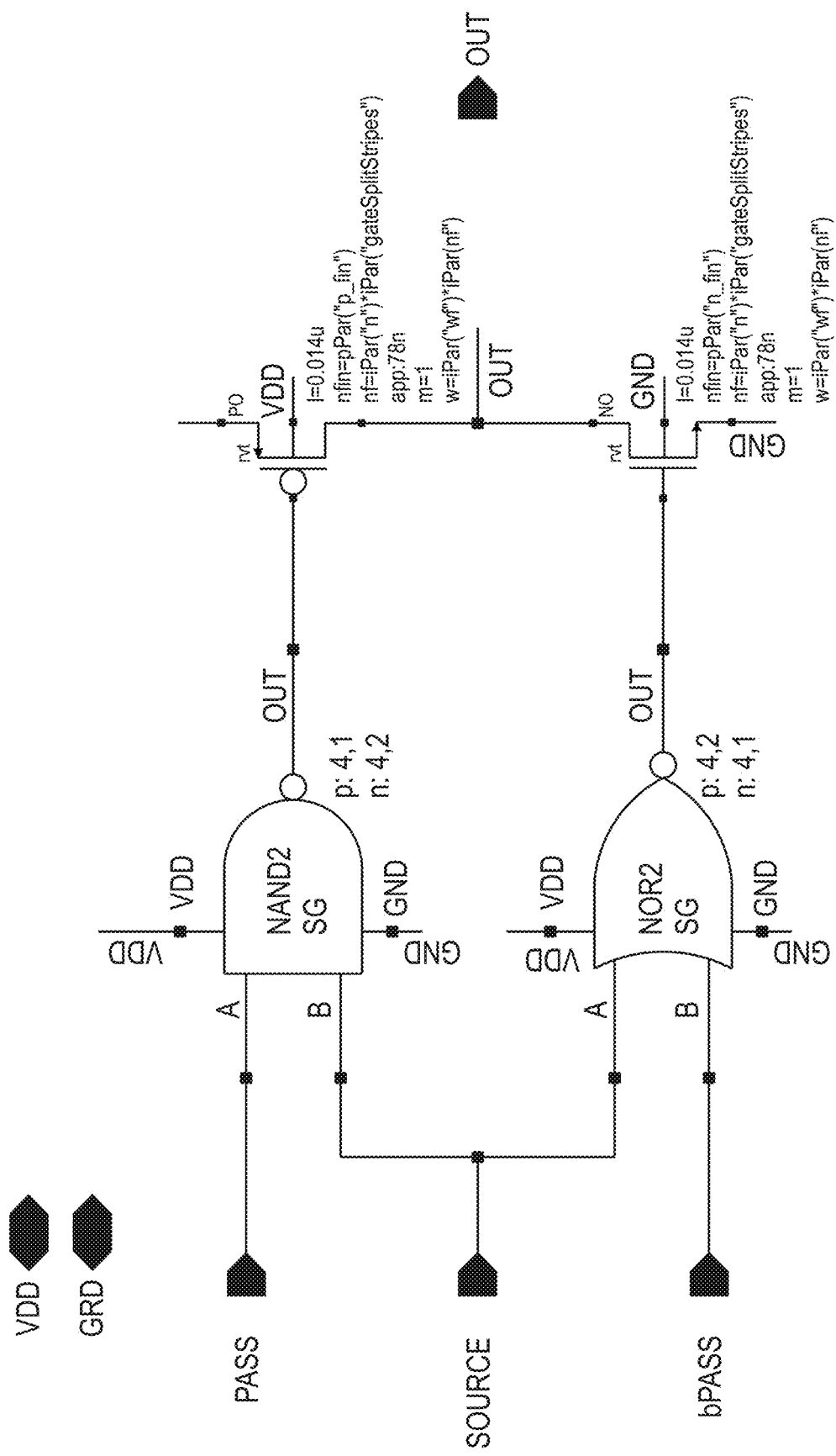
FIG. 14 is a circuit schematic of an exemplary borderguard circuit according to embodiments of the present disclosure.

Referring to FIG. 14, a circuit schematic is provided of an exemplary borderguard circuit according to embodiments of the present disclosure.

Figure 15:
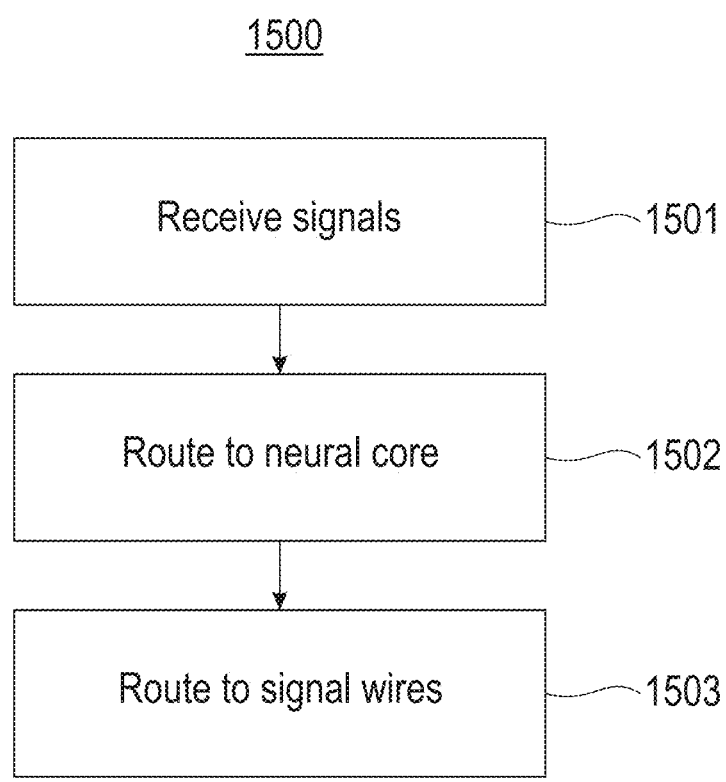
FIG. 15 illustrates a method of operating a multi-core neural network according to embodiments of the present disclosure.

Referring to FIG. 15, a method of operating a multi-core neural network is illustrated according to embodiments of the present disclosure. At 1501, signals are received at a plurality of routers via a plurality of signal wires. At 1502, the signals are selectively routed, by each of the plurality of routers, from at least one signal wire to a neural core. At 1503, signals are selectively routed, by the plurality of routers, from the neural core to the plurality of signal wires. The plurality of routers is configured to segment the plurality of ordered input wires and the plurality of ordered output wires into a plurality of segments and to independently route the signals of each of the plurality of segments. The neural core comprises a plurality of ordered input wires, a plurality of ordered output wires, and a plurality of synapses, each of the synapses operatively coupled to one of the plurality of input wires and one of the plurality of output wires. The plurality of signal wires are disposed along each dimension of an array of neural cores comprising the neural core.

Figure 16:
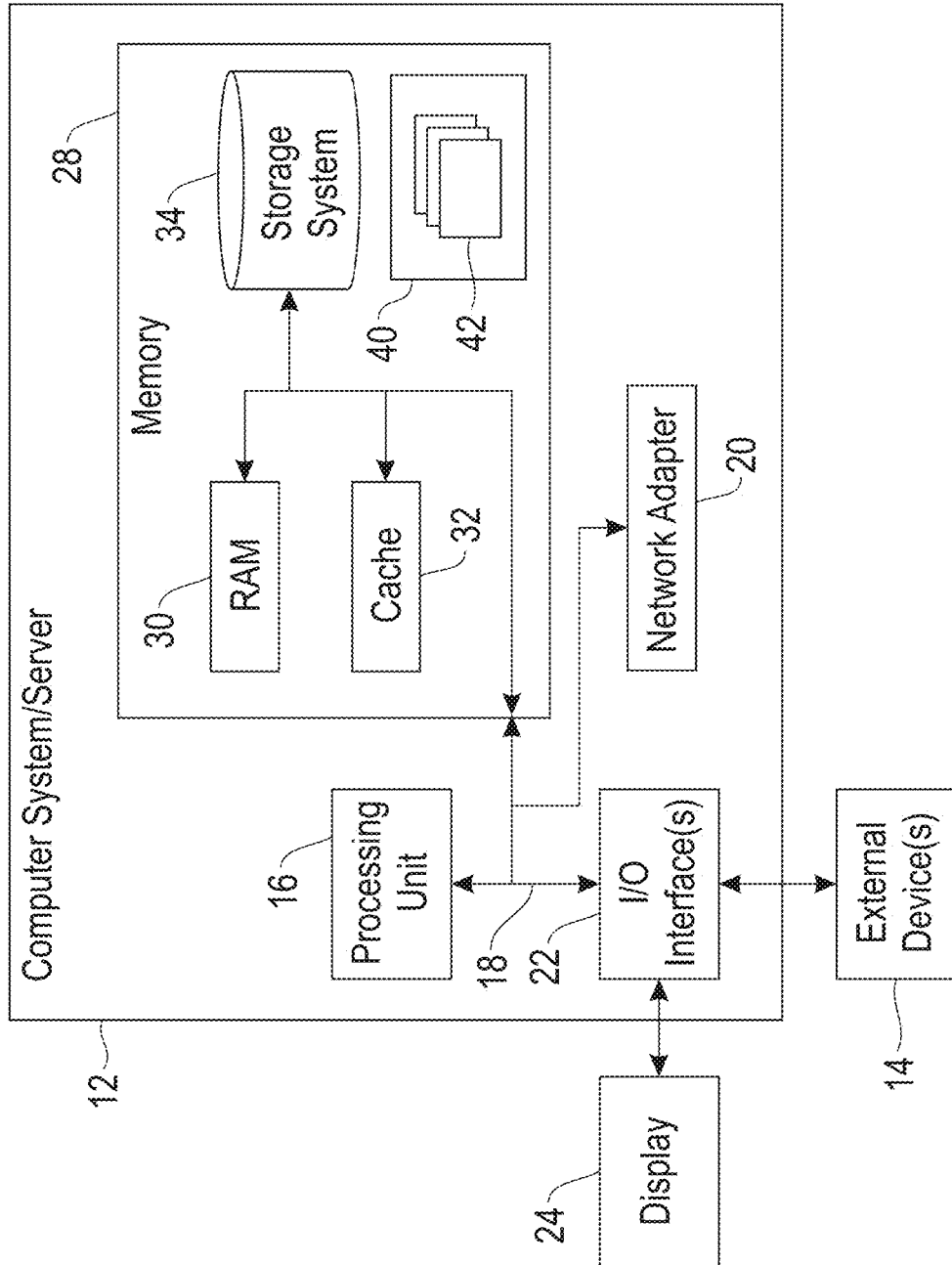
FIG. 16 depicts a computing node according to an embodiment of the present disclosure.

Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
an array of neural cores, the array having at least one dimension, wherein each one of the array of neural cores comprises a plurality of ordered input wires, a plurality of ordered output wires, and a plurality of synapses, each one of the plurality of synapses operatively coupled to one of the plurality of input wires and one of the plurality of output wires;
a plurality of signal wires, wherein:
at least one of the plurality of signal wires is disposed along each dimension of the array of neural cores; and
a plurality of routers, each one of the plurality of routers is operatively coupled to:
one of the plurality of neural cores; and
at least one of the plurality of signal wires along each of the dimensions of the array of neural cores, wherein:
each one of the plurality of routers is configured to selectively route a signal from the at least one signal wire to its coupled neural core,
each one of the plurality of routers is configured to selectively route a signal from its coupled neural core to the at least one signal wire,
each one of the plurality of routers includes a plurality of borderguard circuits;
each one of the borderguard circuits is coupled to an edge of a neural core among the array of neural cores;
each one of the plurality of borderguard circuits includes a plurality of segments; and
the plurality of routers is configured to independently route signals between different neural cores through the plurality of segments.

2. The system of claim 1, wherein the plurality of segments are equally-sized.

3. The system of claim 1, wherein each one of the array of neural cores is configured to concatenate signals routed from segments of borderguard circuits coupled to other neural cores into a combined input vector.

4. The system of claim 1, wherein routing of signals in the plurality of routers is configurable by a routing mask at each one of the array of neural cores.

5. The system of claim 1, wherein the array of neural cores has two dimensions.

6. The system of claim 1, wherein the plurality of signal wires comprises one signal wire corresponding to each one of the plurality of input wires of the array of neural cores and one signal wire corresponding to each one of the plurality of output wires of the array of neural cores.

7. The system of claim 6, wherein the plurality of signal wires are disposed in a plane parallel to the array of neural cores.

8. The system of claim 6, wherein the plurality of signal wires are disposed in a mesh.

9. The system of claim 1, wherein each one of the plurality of routers is configured to selectively bypass its coupled neural core.

10. The system of claim 1, wherein each one of the plurality of routers is configured to transmit a signal in two directions along the at least one of the plurality of signal wire.

11. The system of claim 1, further comprising a plurality of digital buffers, each one of the digital buffers is operatively coupled to one of the plurality of routers, wherein each one of the plurality of digital buffers is configured for signal restoration.

12. The system of claim 1, wherein the plurality of synapses of the array of neural cores are configured as a trained neural network.

13. The system of claim 1, wherein a first direction along the plurality of signal wires corresponds to forward propagation and a second direction along the plurality of signal wires corresponds to backpropagation.

14. A method comprising:
receiving signals at a plurality of routers via a plurality of signal wires;
selectively routing, by each one of the plurality of routers, the signals from at least one signal wire to a neural core among an array of neural cores; and
selectively routing, by the plurality of routers, signals from the neural core to the plurality of signal wires, wherein:
the plurality of routers is configured to segment a plurality of borderguard circuits into a plurality of segments and to independently route the signals between the neural core and different neural cores through the plurality of segments,
the neural core comprises a plurality of ordered input wires coupled to the plurality of borderguard circuits, a plurality of ordered output wires coupled to the plurality of borderguard circuits, and a plurality of synapses, each of the synapses operatively coupled to one of the plurality of input wires and one of the plurality of output wires, and
the plurality of signal wires are disposed along each dimension of an array of neural cores comprising the neural core.

15. The method of claim 14, wherein the plurality of segments are equally-sized.

16. The method of claim 14, wherein each one of the array of neural cores is configured to concatenate signals routed from segments of borderguard circuits coupled to the different neural cores into a combined input vector.

17. The method of claim 14, wherein routing of signals in the plurality of routers is configurable by a routing mask at each one of the array of neural cores.

18. The method of claim 14, wherein the array of neural cores has two dimensions.

19. The method of claim 14, wherein one signal wire corresponds to each one of the plurality of input wires of the array of neural cores and one signal wire corresponds to each one of the plurality of output wires of the array of neural cores.

20. The method of claim 19, wherein the signal wires are disposed in a plane parallel to the array of neural cores.

* * * * *